G. H. DAY.
OPHTHALMIC MOUNTING.
APPLICATION FILED MAY 5, 1915.
1,235,662. Patented Aug. 7, 1917.
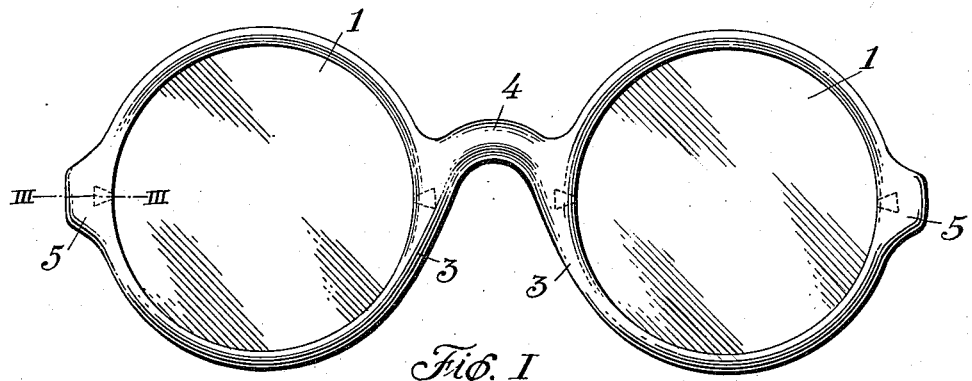
Fig. I
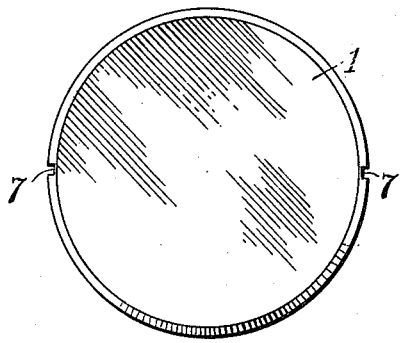
Fig. II
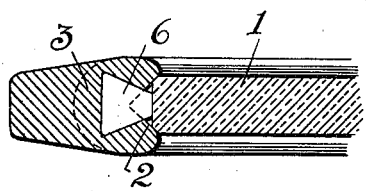
Fig. III
Fig. IV
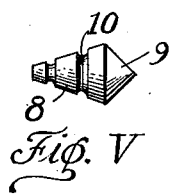
Fig. V
Fig. VI
WITNESSES:
Joseph J. D. Emerz
Carroll Bailey
INVENTOR
George H. Day
BY
H. H. Styll, H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS.

OPHTHALMIC MOUNTING.

1,235,662.

Specification of Letters Patent.

Patented Aug. 7, 1917.

Application filed May 5, 1915. Serial No. 25,987.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings, and has for its primary object to provide means for preventing rotation of lenses within their frames.

Another object is to so place the means for preventing rotation of the lenses within the frame as to render them entirely invisible.

Still another object is to provide means especially adapted for use upon composition frames for the purpose above set forth and to so construct the means as to prevent their accidental disengagement from the frame.

With the foregoing and other objects in view, the invention consists in the novel features of construction, combination and arrangement of parts, as will be hereinafter more fully described, illustrated in the accompanying drawings, and claimed.

In the drawings:

Figure I is a front elevation of a frame and lenses therefor constructed in accordance with the invention.

Fig. II is a face view of one of the lenses.

Fig. III is a detail sectional view on the line III—III of Fig. I.

Fig. IV is a detail perspective view of the locking member.

Fig. V is a side elevation of a slightly modified form of locking member.

Fig. VI is a similar view of another slightly modified form of locking member.

Referring to the drawings by numerals, 1—1 designates the lenses which are herein shown as being circular in shape and as having their edges beveled for engagement in the annular grooves 2 of the frame 3. The frame herein shown is preferably constructed from a suitable composition such as zylonite or the like, and includes the lens portion or frames 3, the connecting bridge 4 and the offset lugs 5 to which the temples are adapted to be secured. It will be obvious that because of the shape of the lenses and frames with which they are engaged, there will be a tendency of the lenses to rotate within the frames unless some means is provided for positively preventing such action.

In order to hold the lenses securely within the frame and prevent rotation thereof, I embed in the material of the frame, preferably when the same is in a soft condition during course of its manufacture, the frustopyramidically shaped locking members 6. These members are preferably disposed at diametrically opposite points upon the frames at the enlarged portions thereof caused by forming the bridge 4 and the lugs 5, but it will be understood that any other preferred location of these members may be made. The larger or base end of the members 6 are placed within the frame in a position so that they face the outer portion thereof; the smaller or inner portions of the members projecting into the groove 2, as is clearly illustrated in Fig. III of the drawings. By so placing the locking members within the frame it will be seen that their accidental disengagement therefrom is positively prevented.

Each of the lenses 1 is provided with a pair of diametrically oppositely disposed slots or recesses 7, into which the inner portion of the locking members 6 are adapted to engage when the lenses are positioned within the grooves of the frame. By so placing the inner portions of the members 6 in engagement with the grooves 7 of the lenses 1, it will be readily seen that rotation of the lenses within the frame is effectually prevented, and by embedding the said member within the material of the frame it will be further seen that no unsightly projecting portions are provided to mar the looks of the mounting. Although I preferably employ two of the locking members upon each of the lenses and arrange them within the frame, as previously stated, I wish to have it understood that but one or a plurality of the locking members may be used and may be positioned at any convenient point or points within the frame.

In Fig. V of the drawings I have shown the frustum 8 as being provided with the cone point 9 for engagement in the slot 7 of the lens 1, the said frustum being provided with annular grooves or recesses 10, into which the composition of the frame is adapted to engage to prevent disengagement of this form of member from the frame.

In Fig. VI of the drawings I have illustrated another slightly modified form of locking member which is shown as comprising the cylindrically shaped portion 11 having the annular corrugations or threads upon the outer face thereof for engagement in the composition of the frame to prevent removal of the member therefrom, and as being provided with the cone point 12 for engagement in the slots of the lenses in a manner similar to the members 6 and 9.

From the foregoing description taken in connection with the accompanying drawings, it is thought that the construction and advantages of the improved mounting should be apparent, and while I have herein shown and described certain specific forms of my invention I do not wish to be limited to any particular construction or arrangement of the parts except to such limitations as the claims may import.

I claim:

1. In an ophthalmic mounting, the combination with a round eye lens receiving frame having a groove for the reception of the lens, of a lens fitted within the groove and provided with a notch in the periphery thereof and a locking projection carried by the frame and disposed entirely within the groove and outside the inner periphery of the frame, said projection being adapted to interlock with the notch in the lens to secure the lens against accidental rotation within the frame.

2. The combination with a non-metallic circular lens frame having a groove for the reception of a lens, of a locking device to prevent accidental rotation of the lens in the frame, said locking device having a portion embedded in the frame and a portion projecting into the groove of the frame, the entire locking device being disposed below the upper edge of the groove whereby it is invisible when the frame is viewed from the front.

In testimony whereof I affix my signature in presence of two witnesses.

GEORGE H. DAY.

Witnesses:
CARROLL BAILEY,
JOSEPH J. DEMERS.